US008416003B2

(12) United States Patent
Chen et al.

(10) Patent No.: US 8,416,003 B2
(45) Date of Patent: Apr. 9, 2013

(54) PROCESSOR FREQUENCY ADJUSTMENT CIRCUIT

(75) Inventors: Chun-Sheng Chen, New Taipei (TW); Feng-Long He, Shenzhen (CN); Hua Zou, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 67 days.

(21) Appl. No.: 13/230,860

(22) Filed: Sep. 13, 2011

(65) Prior Publication Data
US 2012/0326761 A1 Dec. 27, 2012

(30) Foreign Application Priority Data
Jun. 23, 2011 (CN) .......................... 2011 1 0170575

(51) Int. Cl.
G06F 1/04 (2006.01)
H03K 3/00 (2006.01)
(52) U.S. Cl. ......... 327/291; 327/112; 327/293; 327/294
(58) Field of Classification Search .................. 327/165, 327/166, 291–299, 374, 178; 326/93–98; 716/6
See application file for complete search history.

(56) References Cited

U.S. PATENT DOCUMENTS

| 6,047,031 A * | 4/2000 | Allott et al. | 375/317 |
|---|---|---|---|
| 6,140,857 A * | 10/2000 | Bazes | 327/307 |
| 2004/0184910 A1* | 9/2004 | Busch | 415/13 |
| 2009/0051418 A1* | 2/2009 | Gogl et al. | 327/540 |
| 2011/0080191 A1* | 4/2011 | Patel et al. | 327/105 |
| 2011/0291724 A1* | 12/2011 | Jain et al. | 327/175 |
| 2012/0187994 A1* | 7/2012 | Yang et al. | 327/233 |
| 2012/0319743 A1* | 12/2012 | Morishita et al. | 327/110 |

* cited by examiner

*Primary Examiner* — Lincoln Donovan
*Assistant Examiner* — Brandon S Cole
(74) *Attorney, Agent, or Firm* — Altis Law Group, Inc.

(57) ABSTRACT

A processor frequency adjustment circuit for adjusting a frequency of a processor includes a voltage converting module, a first reference voltage generating module, a clock chip, a voltage comparing module. The voltage converting module converts a pulse voltage into a constant voltage. The first reference voltage generating module generates a first reference voltage. The voltage comparing module is connected with the voltage converting module, the first reference voltage generating module, and the clock chip to compare the constant voltage with the first reference voltage, and generates a first voltage level signal to a first terminal of the clock chip; the clock chip adjusts the frequency of the processor in response to obtaining the first voltage level signal.

17 Claims, 2 Drawing Sheets

8,416,003 B2

PROCESSOR FREQUENCY ADJUSTMENT CIRCUIT

BACKGROUND

1. Technical Field

The present disclosure relates to circuitry, and particularly, to a processor frequency adjustment circuit.

2. Description of Related Art

Processor frequency specifies the operation speed of the processor for a computer, and most processors are set to run at a default frequency. The processor frequency can be manually adjusted to increase the computing power of the processor. However, manual adjustment is troublesome and cannot be done in real time to correspond to the workload of the computer.

Therefore, what is needed is a processor frequency adjustment circuit that overcomes the above-mentioned problem.

BRIEF DESCRIPTION OF THE DRAWINGS

The components in the drawings are not necessarily drawn to scale, the emphasis instead being placed upon clearly illustrating the principles of a processor frequency adjustment circuit. Moreover, in the drawings, like reference numerals designate corresponding parts throughout the several views.

DETAILED DESCRIPTION

Figure 1:
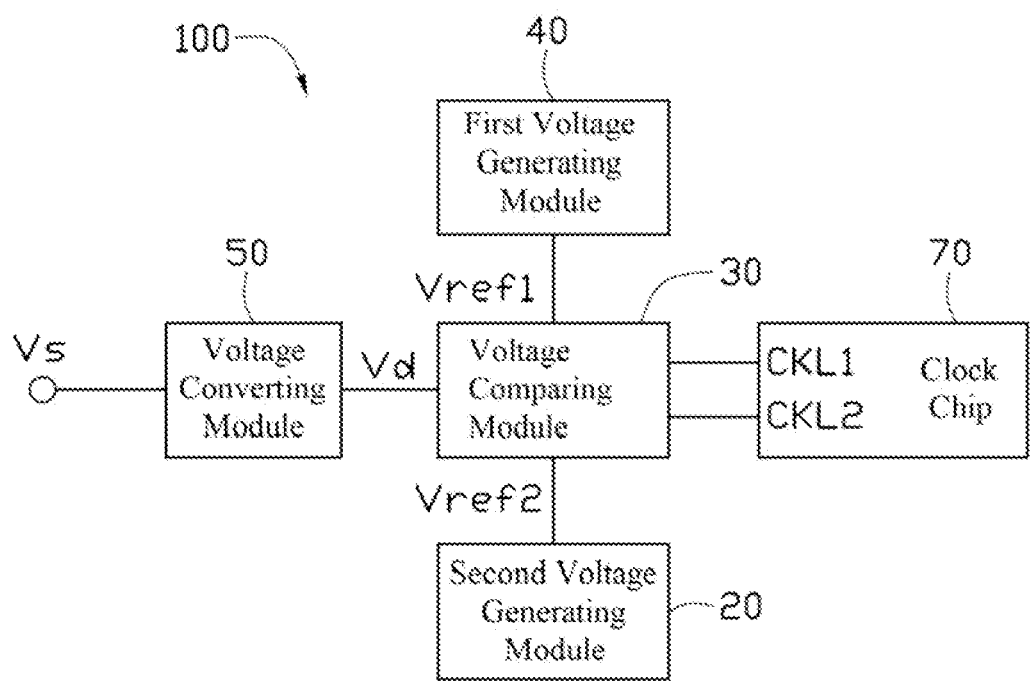
FIG. 1 is a schematic diagram of a processor frequency adjustment circuit in accordance with an exemplary embodiment.

Referring to FIG. 1, a processor frequency adjustment circuit 100 includes a voltage converting module 50, a first voltage generating module 40, a second voltage generating module 20, a voltage comparing module 30, and a clock chip 70. The processor frequency adjustment circuit 100 can adjust the processor frequency of a computer using a read/write of a hard drive as an indicator for a workload of the computer.

A Southbridge chipset of the computer can output a pulse voltage (Vs) changing in correspondence to the read/write of the hard drive, and the voltage converting module 50 converts the pulse voltage into a constant voltage (Vd). The first voltage generating module 40 and the second voltage generating module 20 generate a first reference voltage (Vref1) and a second reference voltage (Vref2), respectively. In the present embodiment, the first reference voltage is set to be higher than the second reference voltage. The first reference voltage, the second reference voltage, and the constant voltage are applied to the voltage comparing module 30. The voltage comparing module 30 compares the first reference voltage, the second reference voltage, and the constant voltage to determine the workload of the hard drive, and transmits a low voltage level or a high voltage level to a first terminal CKL1 and a second terminal CKL2 of the clock chip 70. If Vd>Vref1, the hard drive is determined to be idle, and the clock chip 70 controls the processor to work at a default frequency; if Vref2<Vd<Vref1, the hard drive is determined to be at low workload, and the clock chip 70 controls the processor to work at a high frequency, higher than the default frequency; if Vd<Vref2, the hard drive is determined to be at high workload, and the clock chip 70 controls the processor to work at the highest frequency.

Figure 2:
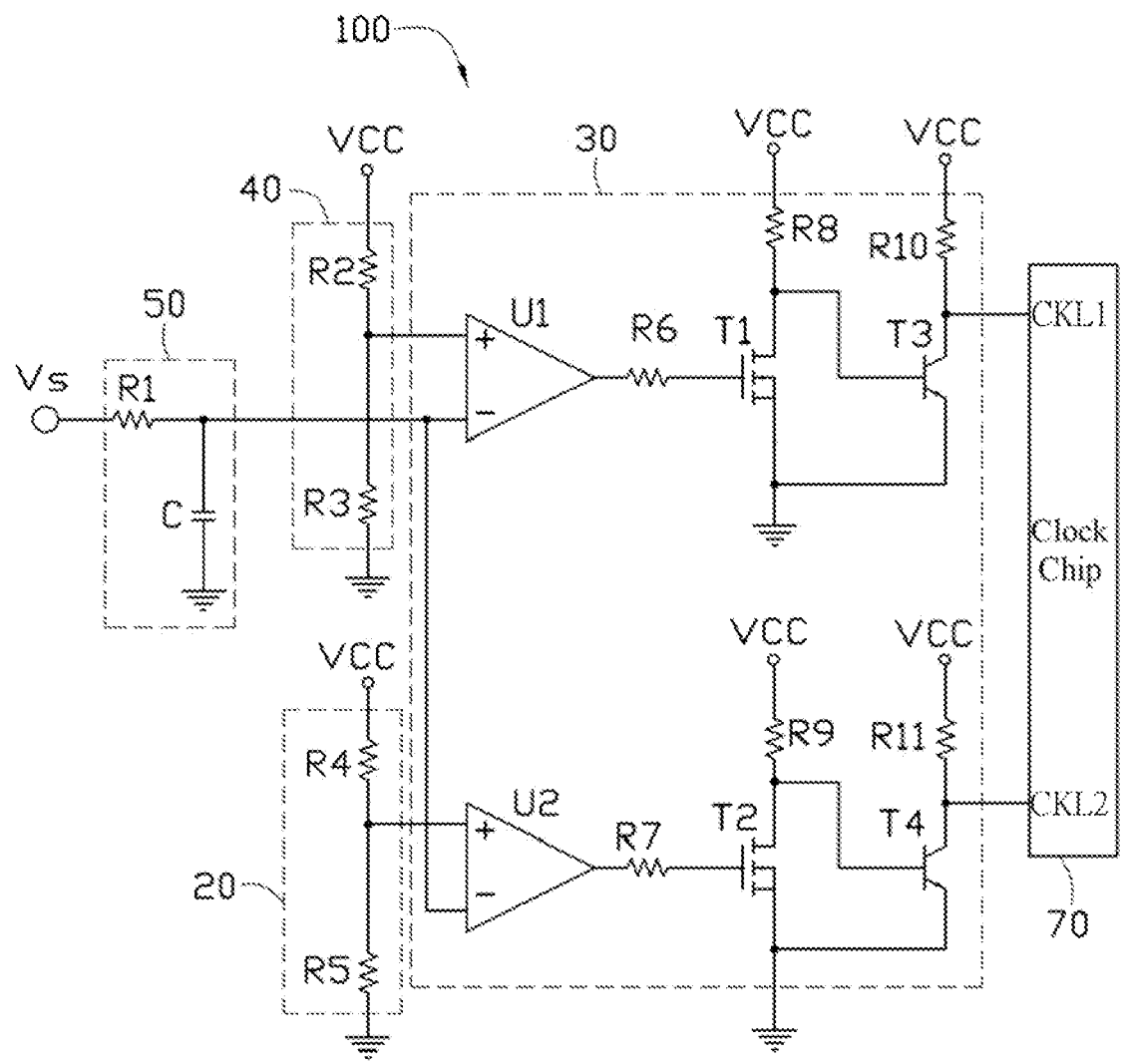
FIG. 2 is a circuit diagram of the processor frequency adjustment circuit of FIG. 1, in accordance with an exemplary embodiment

Referring to FIG. 2, the voltage converting module 50 includes a resistor R1 and a capacitor C, and the pulse voltage is applied through the resistor R1 and is grounded through the capacitor C. The constant voltage is formed between the resistor R1 and the capacitor, and is output from the voltage converting module 50 to the voltage comparing module 30. The first voltage generating module 40 includes a resistor R2 and a resistor R3 connected between a power supply pin VCC and ground. The first reference voltage is formed between the resistor R2 and the resistor R3, and can be adjusted by changing the resistances of the resistor R2 and the resistor R3. The first reference voltage is output from the first voltage generating module 40 to the voltage comparing module 30.

The voltage comparing module 30 includes an operational amplifier U1, a switch T1, and a switch T3. The constant voltage and the first reference voltage are connected with an inverting input and a non-inverting input of the operational amplifier U1, respectively, and the output of the operational amplifier U1 is connected with the switch T1. In the present embodiment, the switch T1 is a nMOSFET, and an gate of the switch T1 is connected with the output of the operational amplifier U1 through a resistor R6; a source of the switch T1 is grounded; an drain of the switch T1 is connected with VCC through a resistor R8, and a node between the drain and the resistor R8 is further connected with a switch T3. In the present embodiment, the switch T3 is an npn transistor, and a base of the switch T3 is connected to the node between the drain of the switch T1 and the resistor R8; a collector of the switch T3 is connected with VCC through a resistor R10; an emitter of the switch T3 is grounded. A node between the collector of the switch T3 and the resistor R10 is further connected to the first terminal CKL1 of the clock chip 70.

The second voltage generating module 20 includes a resistor R4 and a resistor R5 with an identical layout as the first voltage generating module 40 to determining the second reference voltage, and the second reference voltage is output from the second voltage generating module 20 to the voltage comparing module 30. The voltage comparing module 30 further includes an operational amplifier U2, a resistor R7, a switch T2, a resistor R9, a switch T4, and a resistor R11 with an identical layout as the operational amplifier U1, the resistor R6, the switch T1, the resistor R8, the switch T3, and the resistor R10. A node between a collector of the switch T4 and the resistor R11 is connected to the second terminal CKL2 of the clock chip 70.

When the hard drive is idle, the constant voltage converted by the voltage converting module 50 is higher than the first reference voltage and the second reference voltage, and thus in the operational amplifier U1, the inverting input is higher than the non-inverting input, and a low voltage level is output to the gate of the switch T1 to open the switch T1. The base of the switch T3 is connected to VCC when the switch T1 is open, and the switch T3 is closed. When the switch T3 is closed, the first terminal CKL1 of the clock chip 70 is grounded and acquires a low voltage level. As the constant voltage is also higher than the second reference voltage, the second terminal CKL2 acquires a low voltage level as well as the first terminal CKL1, and the clock chip 70 allows the processor to work at a default frequency.

When the hard drive is at low workload, the constant voltage converted from the voltage converting module 50 is lower than the first reference voltage and higher than the second reference voltage, and thus in the operational amplifier U1, the inverting input is lower than the non-inverting input, and a high voltage level is output to the gate of the switch T1 to close the switch T1. The base of the switch T3 is grounded when the switch T1 is closed, and the switch T3 is opened.

When the switch T3 is opened, the first terminal CKL1 of the clock chip 70 is connected to VCC and acquires a high voltage level. As the constant voltage is higher than the second reference voltage, the second terminal CKL2 acquires a low voltage level, and the clock chip 70 controls the processor to work at a high frequency.

When the hard drive is at high workload, the constant voltage converted from the voltage converting module 50 is lower than the first reference voltage and the second reference voltage. The first terminal CKL1 and the second terminal CKL2 both acquire high voltage level, and the clock chip 70 controls the processor to work at a highest frequency.

Therefore, the processor frequency adjustment circuit 100 can automatically adjust the frequency of the processor in accordance with the workload of the hard drive. In the present embodiment, the first terminal CKL1 and the second terminal CKL2 of the clock chip 70 are used to divide the processor frequency into three segments, and increasing or decreasing the number of terminals of the clock chip 70 an the corresponding circuit can change the segment number of the processor frequency.

Although the present disclosure has been specifically described on the basis of this exemplary embodiment, the disclosure is not to be construed as being limited thereto. Various changes or modifications may be made to the embodiment without departing from the scope and spirit of the disclosure.

What is claimed is:

1. A processor frequency adjustment circuit for adjusting a frequency of a processor, comprising:
a voltage converting module for converting a pulse voltage into a constant voltage, the pulse voltage being changing in correspond to read/write of a hard drive;
a first reference voltage generating module for generating a first reference voltage;
a clock chip comprising a first terminal;
a voltage comparing module connected with the voltage converting module, the first reference voltage generating module, and the clock chip;
wherein the voltage comparing module compares the constant voltage with the first reference voltage, and generates a first voltage level signal to the first terminal of the clock chip; the clock chip adjusts the frequency of the processor in response to obtaining the first voltage level signal.

2. The processor frequency adjustment circuit as claimed in claim 1, wherein the voltage comparing module comprises a first comparing unit comprising a first input, a second input, and an output; the first input and the second input are inputted with the constant voltage and the first reference voltage, respectively; the output of the first comparing unit is connected to the first terminal of the clock chip.

3. The processor frequency adjustment circuit as claimed in claim 2, wherein the voltage comparing module comprises a first switch and a second switch, and the first comparing unit is connected to the first terminal through the first switch and the second switch.

4. The processor frequency adjustment circuit as claimed in claim 3, wherein the first switch is a nMOSFET, and a gate, a source, and a drain of the first switch are connected with the output of the first comparing unit, a power supply pin, and ground, respectively; the drain of the first switch is further connected with the second switch.

5. The processor frequency adjustment circuit as claimed in claim 4, wherein the second switch is a npn transistor, and a base, a collector, and an emitter of the second switch are connected with the drain of the first switch, the power supply pin, and ground; the collector is further connected with the first terminal of the clock chip.

6. The processor frequency adjustment circuit as claimed in claim 2, wherein the first comparing unit is an operational amplifier, and the first input and the second input are a non-inverting input and an inverting input, respectively.

7. The processor frequency adjustment circuit as claimed in claim 1, further comprises a second reference voltage generating module for generating a second reference voltage, wherein the second reference voltage is lower than the first reference voltage; the voltage comparing module compares the constant voltage with the second reference voltage, and generates a second reference voltage signal to a second terminal of the clock chip; the clock chip adjusts the frequency of the processor in response to obtaining the second voltage level signal.

8. The processor frequency adjustment circuit as claimed in claim 7, wherein the voltage comparing module comprises a second comparing unit comprising a first input, a second input, and an output; the first input and the second input are inputted with the constant voltage and the second reference voltage, respectively; the output is connected to the second terminal of the clock chip.

9. The processor frequency adjustment circuit as claimed in claim 8, wherein the voltage comparing module comprises a first switch and a second switch, and the second comparing unit is connected to the second terminal through the first switch and the second switch.

10. The processor frequency adjustment circuit as claimed in claim 9, wherein the first switch is a nMOSFET, and a gate, a source, and a drain of the first switch are connected with the output of the second comparing unit, respectively; a power supply pin, and ground; the drain of the first switch is further connected with the second switch.

11. The processor frequency adjustment circuit as claimed in claim 10, wherein the second switch is a npn transistor, and a base, a collector, and an emitter of the second switch are connected with the drain of the first switch, the power supply pin, and ground; the collector is further connected with the second terminal of the clock chip.

12. The processor frequency adjustment circuit as claimed in claim 8, wherein the first comparing unit is an operational amplifier, and the first input and the second input are a non-inverting input and an inverting input, respectively.

13. The processor frequency adjustment circuit as claimed in claim 7, wherein the second reference generating module comprises a first resistor and a second resistor, and a power supply pin is connected to ground through the first resistor and the second resistor; the first reference voltage is formed on a node between the first resistor and the second resistor, and the node is connected with the voltage comparing module.

14. The processor frequency adjustment circuit as claimed in claim 7, wherein if the constant voltage is higher than the first reference voltage and the second reference voltage, the processor frequency is at a default frequency; if the constant voltage is lower than the first reference voltage and higher than the second reference voltage, the processor frequency is at a high frequency; if the constant voltage is lower than the first reference voltage and the second reference voltage, the processor frequency is at a highest frequency.

15. The processor frequency adjustment circuit as claimed in claim 1, wherein the first reference generating module comprises a first resistor and a second resistor, and a power supply pin is connected to ground through the first resistor and the second resistor; the first reference voltage is formed on a node between the first resistor and the second resistor, and the node is connected with the voltage comparing module.

16. The processor frequency adjustment circuit as claimed in claim 1, wherein if the constant voltage is higher than the first reference voltage, the processor frequency is at a default frequency; if the constant voltage is lower than the first reference voltage, the processor frequency is at a high frequency.

17. The processor frequency adjustment circuit as claimed in claim 1, wherein the voltage converting circuit comprises a resistor and a capacitor, and the pulse voltage is grounded through the resistor and the capacitor; the constant voltage is formed on a node between the resistor, and the capacitor and the node is connected with the voltage comparing module.

* * * * *